United States Patent
Pan et al.

(10) Patent No.: US 6,678,435 B2
(45) Date of Patent: Jan. 13, 2004

(54) EFFICIENT THERMAL ACTIVATION OPTICAL SWITCH AND METHOD OF MAKING THE SAME

(75) Inventors: Yaoling Pan, Sunnyvale, CA (US); Michele Palmieri, Agrate Brianza (IT); Richard E. Haven, Sunnyvale, CA (US)

(73) Assignees: Agilent Technologies, Inc., Palo Alto, CA (US); ST Microelectronics, Inc., Carrollton, TX (US)

( * ) Notice: Subject to any disclaimer, the term of this patent is extended or adjusted under 35 U.S.C. 154(b) by 113 days.

(21) Appl. No.: 09/861,120

(22) Filed: May 18, 2001

(65) Prior Publication Data

US 2002/0172449 A1 Nov. 21, 2002

(51) Int. Cl.[7] .................................................. G02B 6/26
(52) U.S. Cl. ......................................................... 385/16
(58) Field of Search ................................. 385/14, 15, 16, 385/17, 31, 129, 131, 132

(56) References Cited

U.S. PATENT DOCUMENTS

| 5,699,462 | A | * | 12/1997 | Fouquet et al. | 385/18 |
| 6,072,924 | A | * | 6/2000 | Sato et al. | 385/18 |
| 6,360,775 | B1 | * | 3/2002 | Barth et al. | 137/828 |
| 6,389,189 | B1 | * | 5/2002 | Edwards et al. | 385/18 |
| 6,404,942 | B1 | * | 6/2002 | Edwards et al. | 385/18 |
| 6,515,346 | B1 | * | 2/2003 | Kemeny | 257/618 |

* cited by examiner

*Primary Examiner*—Frank G. Font
*Assistant Examiner*—Kevin C Kianni

(57) ABSTRACT

An optical switch having an insulator under a heater element is disclosed. The insulator reduces the heat loss thereby making the switch more efficient. The insulator is fabricated embedded in the underlying substrate on which the heater and the optical intersection are fabricated. A method of fabricating the optical switch having an insulator is disclosed. A trench is etched on the substrate and filled with oxide or other suitable insulating material. Then, the heater and the optical intersection are fabricated above the insulator.

19 Claims, 1 Drawing Sheet

EFFICIENT THERMAL ACTIVATION OPTICAL SWITCH AND METHOD OF MAKING THE SAME

BACKGROUND

The present invention relates to the art of thermal activation optical switches. More particularly, the present invention relates to efficient thermal activation optical switches and the method of fabricating the same.

In the field of electronic and data communications, bandwidth demand is surging because of the rapidly increasing number of users, higher communications access speeds, longer connection times, and the use of rich media, such as audio, video, and high-resolution graphics. Optical networks, having greater bandwidth than traditional electrical networks, are becoming increasingly popular.

For switching optical signals (lights), optical switches based on liquid and bubble technique have been used. In these switches, multiple optical paths are placed in as a matrix on planar-light wave circuits (PLC), or wave-guides, crossing at several intersections, each intersection being a switch. At an intersection, the light travels through fluid with the same optical properties as the wave-guide. As a result, the light travels unimpeded through the intersection.

When the light needs to be rerouted to a new path, a bubble is created in the intersection. The bubble displaces the fluid and alters the optical properties of the intersection, causing the light to be reflected to the new path. The bubble is created by heating the fluid at the intersection and eliminated by removing the heat. The bubble can be generated and removed quickly providing a fast and reliable switching function. For example, the bubble can be generated in several microseconds. Further, the bubble can be sustained by maintaining the heat at the intersection. In fact, by maintaining the heat at the intersection, the switching of the light can be maintained for an indefinite period of time. The heat is typically provided by applying electrical current, or power, through a heating element, usually a high-resistance resistor. The heat is maintained by continuous application of the power through the heating element.

During the generation and the maintenance of the bubble, the heat dissipates to the surrounding material (especially to the substrate on which the heater is fabricated) and is lost. The heat dissipation and loss lead to several problems. First, the switch is inefficient. That is, much of the applied power is lost to the substrate instead of being used to heat the fluid. Second, the power required to generate and to maintain the bubble is greater than the power required to do so without the heat loss. Because of the heat loss, the switch in general and the heater in particular, has a relatively high power requirement. The high power requirement not only increases power costs, but it also increases component costs throughout the entire system. This is because the requirement necessitates the use of components that are able to handle the relative higher power.

Third, the dissipated heat adversely affects surrounding circuits. Fourthly, the heater has a relatively high power density because of the high power requirement. This leads to premature heater problems such as fusing. Fifthly, the high power, thus the current, requirement may required special high voltage high current on-chip circuit which is difficult to do. Finally, because the heat loss, the switch-on time is longer than the switch-on time without the heat loss.

Accordingly, there is a need for an optical switch that overcomes the problems discussed above.

SUMMARY

The need is met by the present invention. According to one aspect of the present invention, an optical switch has an insulator on a substrate. A heater is fabricated above the insulator of the substrate, and an optical intersection is constructed above the heater.

According to another aspect of the present invention, a method of fabricating an optical switch is disclosed. First, an insulator is fabricated. Then, a heater is fabricated above the insulator. Finally, an optical intersection is constructed above the heater.

Other aspects and advantages of the present invention will become apparent from the following detailed description, taken in combination with the accompanying drawings, illustrating by way of example the principles of the invention.

DETAILED DESCRIPTION

Figure 1:
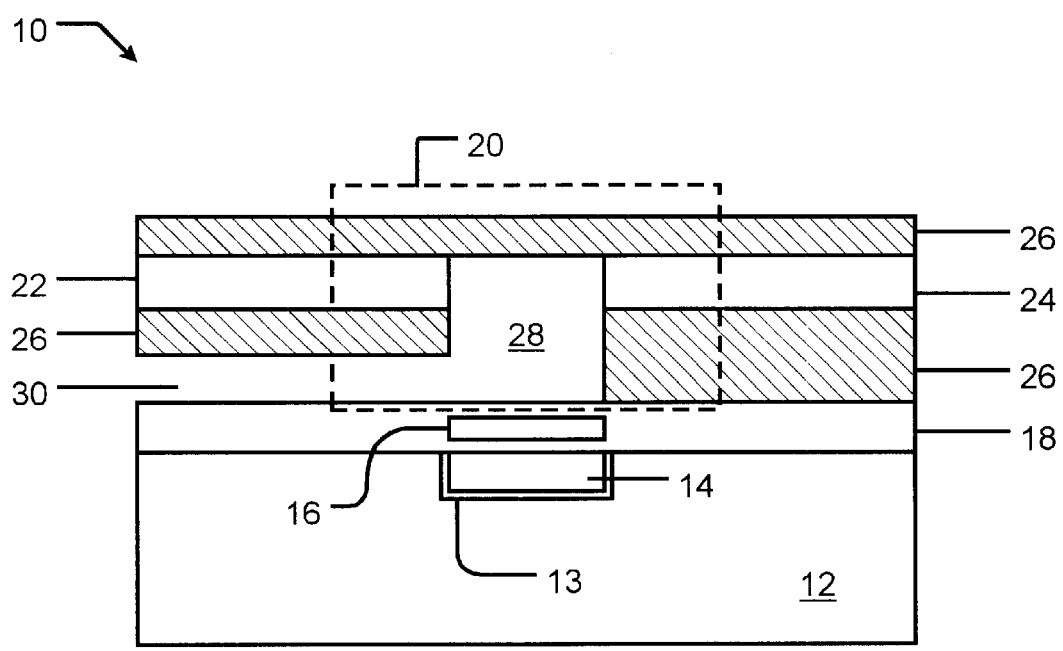
FIG. 1 is a side sectional view of an optical switch in accordance with one embodiment of the present invention.

As shown in the drawings for purposes of illustration, the present invention is embodied in an optical switch having an insulator on a substrate. A heater is fabricated above the insulator of the substrate, and an optical intersection is constructed above the heater. Because the insulator reduces the loss of heat, the switch is more efficient, less power is required to generate and to maintain a bubble, surrounding circuits are less affected, and the switch-on time is decreased. Moreover, since less power is applied to the heater, the reliability of the heater is increased.

Referring to FIG. 1, an optical switch 10 (the "switch 10") illustrates one embodiment of the present invention. The switch 10 is fabricated on a substrate 12. A typical substrate 12 is a Silicon (Si) based substrate 12. An insulator 14 is on the substrate. Here, the prepositional word "on" is used, without limitation, as a function word to indicate position in contact with, supported by, in close proximity to, embedded in, built-in the substrate 12. In fact, for the illustrated embodiment, the insulator 14 is embedded in the substrate 12. The insulator 14 and the substrate 12 may be separated by a thin layer of whetting oxide 13.

A heater 16 is fabricated above the insulator 14. The heater 16 may be made from a high resistance resistor using such material as TaAl (Tantalum Aluminum), TaN (Tantalum Nitride), Ni (Nickel), Cr (Chromium), Polysilicon, or other suitable material. The heater 16 is typically fabricated within a heater circuit layer 18. The heater circuit layer 18 may include multiple sub-layers, the sub-layers forming circuits to deliver power to the heater 16.

In one embodiment, the insulator 14 covers substantially the same area of as the heater 16. The insulator 14 has a thickness ranging from 1.7 to 15 microns. In one embodiment, the insulator 14 is between ten to twelve microns thick. The insulator 14 may be an oxide such as Silicon oxide or other suitable material having low thermal conductivity properties such as Silicon Nitride, Silicon Carbide, Aluminum Nitride, or Aluminum Oxide.

An optical intersection 20 is constructed above the heater 16. In FIG. 1, the optical intersection is generally indicated by a dashed rectangular box 20. The optical intersection 20 includes a first wave-guide 22 and a second wave-guide 24, both having ends terminating at the intersection 20. A third wave-guide (not shown), a fourth wave-guide (not shown), or both may also terminate at the intersection 20.

The structure of the heater circuit layer 18 including the heater 16 and the structure of the optical intersection 20 including the third and the fourth wave-guides are known in the art. For example, see U.S. Pat. No. 5,699,462 issued on Dec. 16, 1997 to Fouquet et al. and U.S. Pat. No. 5,852,689 issued on Dec. 22, 1998 to Donald. Both of these patents are incorporated herein by reference. In particular, FIG. 1A of the '689 patent illustrates an optical intersection including four wave-guides.

Continuing to refer to FIG. 1, the optical intersection 20 includes wave-guide substrate 26 surrounding the wave-guides 22, 24 and defining a liquid chamber 28 for housing liquid. The wave-guide substrate 26 may also define a channel 30 for the liquid to access the chamber 28.

In the off state, the chamber 28 of the switch 10 is filled with the liquid having same optical properties as the wave-guide. Accordingly, optical signal (light) entering the chamber 28 (for example, from the wave-guide 22) passes through the chamber 28 unimpeded (and reaches, for example, the second wave-guide 24). In the on state, power is sent to the heater 16 to generate a bubble within the chamber 28, the bubble giving the chamber 28 a different refractive index than the wave-guide. As a result, the light is reflected toward a different wave-guide, thus implementing the switching function.

The optical switch 10 may be fabricated as follows: First, the insulator 14 is fabricated on the substrate 12. This is accomplished by etching a trench on the substrate 12, filling the trench with insulation material (for example, Silicon oxide or other suitable material having low thermal conductivity properties such as Silicon Nitride, Silicon Carbide, Aluminum Nitride, or Aluminum Oxide), and planarizing. For example, the trench etch can be performed by a Silicon (Si) etch processes such as wet chemical or dry plasma including reactive ion etch. The filling process can be performed using a chemical vapor deposition (CVD) processes such as LPCVD (low pressure CVD), APCVD (Atmospheric Pressure CVD) oxide deposition, PECVD (plasma enhanced CVD) TEOS (tetraethylorthosilicate) deposition, or SOG (spin on glass). The surface planarization can be performed by either CMP (chemical and mechanical polishing) or photo resist etching back. A whetting oxide layer 13 may be formed after the trench etching but before the filling process.

The insulator may cover an area substantially similar to the area covered by the heater 16. After the insulator 14 is fabricated, then the heater 16 is fabricated above the insulator 14. Techniques to fabricate the heater 18 using a heater circuit layer 18 are known in the art. Finally, the optical intersection 20 is constructed above the heater 16. Again, techniques to construction the optical intersection 20 is known in the art.

From the foregoing, it will be appreciated that the present invention is novel and offers advantages over the current art. The present invention results in a more efficient optical switch minimizing or eliminating various problems associated with inefficient optical switches such as heat loss and high power requirement. Although a specific embodiment of the invention is described and illustrated above, the invention is not to be limited to the specific forms or arrangements of parts so described and illustrated. For example, differing configurations, sizes, or materials may be used to practice the present invention. The invention is limited by the claims that follow.

What is claimed is:

1. An optical switch comprising:
   an insulator embedded on a substrate;
   a heater fabricated above the insulator of the substrate;
   an optical intersection constructed above the heater; and
   wherein lateral extent of said insulator is substantially similar to lateral extent of said heater and wherein said insulator is embedded in the substrate and separated from the substrate.

2. The switch recited in claim 1 wherein the insulator covers an area that is substantially same as area covered by the heater.

3. The switch recited in claim 1 wherein the insulator comprises material selected from a group consisting of Silicon Oxide, Silicon Nitride, Silicon Carbide, Aluminum Nitride, and Aluminum Oxide.

4. The switch recited in claim 1 wherein the insulator is ten to twelve microns thick.

5. The switch recited in claim 1 wherein the insulator is 1.7 to 15 microns thick.

6. The switch recited in claim 1 wherein the heater is made from material selected from a group consisting of TaAl (Tantalum Aluminum), TaN (Tantalum Nitride), Ni (Nickel), Polysilicon, and Cr (Chromium).

7. The switch recited in claim 1 wherein the optical intersection comprises a first and a second waveguide segments each having an end meeting at a chamber, the chamber having fluid.

8. A method of fabricating an optical switch, the method comprising:
   embedding an insulator within a substrate;
   fabricating a heater above the insulator;
   constructing an optical intersection above the heater; and
   wherein lateral extent of said insulator is substantially similar to lateral extent of said heater and wherein said insulator is embedded in the substrate and separated from the substrate.

9. A method of fabricating an optical switch, the method comprising:
   etching a trench on a surface of a substrate;
   filling the trench with oxide forming an insulator;
   planarizing the surface;
   fabricating a heater above the insulator; and
   constructing an optical intersection above the heater.

10. The method recited in claim 9 wherein the trench is 1.7 to 15 microns deep.

11. The method recited in claim 9 further comprising a step of photo masking to define the trench.

12. The method recited in claim 9 further comprising a step of forming, following the etch of the trench, a think layer of oxide on sidewalls of the trench.

13. The method recited in claim 9 wherein the step of filling the trench is performed using a chemical vapor deposition (CVD) process.

14. The method recited in claim 9 wherein the step of filling the trench is performed using tetraethylorthosilicate (TEOS) deposition technique.

15. The method recited in claim 9 wherein the step of filling the trench is performed using spin on glass (SOG) deposition technique.

16. The method recited in claim 9 wherein the insulator covers an area that is substantially same as area covered by the heater.

17. The method recited in claim 9 wherein the insulator comprises material selected from a group consisting of Silicon Oxide, Silicon Nitride, Silicon Carbide, Aluminum Nitride, and Aluminum Oxide.

18. The method recited in claim 9 wherein the heater is fabricated using material selected from a group consisting of TaAl (Tantalum Aluminum), TaN (Tantalum Nitride), Ni (Nickel), Polysilicon, and Cr (Chromium).

19. The method recited in claim 9 wherein the optical intersection comprises a first and a second waveguide segments each having an end meeting at a chamber, the chamber having fluid.

* * * * *